C. H. REYNOLDS.
TIRE-UPSETTER.

No. 173,060. Patented Feb. 1, 1876.

WITNESSES:
E. Wolff.
Alex F. Roberts

INVENTOR:
C. H. Reynolds
BY
Munn & Co
ATTORNEYS.

UNITED STATES PATENT OFFICE.

CHARLES H. REYNOLDS, OF BROOKLYN, NEW YORK, ASSIGNOR TO HIMSELF AND WILLIAM FREUDEL, OF SAME PLACE.

IMPROVEMENT IN TIRE-UPSETTERS.

Specification forming part of Letters Patent No. 173,060, dated February 1, 1876; application filed November 13, 1875.

*To all whom it may concern:*

Be it known that I, CHARLES H. REYNOLDS, of Brooklyn, in the county of Kings and State of New York, have invented a new and Improved Tire-Upsetter, of which the following is a specification:

This invention consists of griper-jaws fixed on pivots so as to adjust automatically to tires of any radius; and it also consists of a novel contrivance of the pivots for both the stationary and movable jaws, contrived so that the resistance is taken directly by the supporting-blocks instead of being expended on pivot bolts, whereby a more substantial and desirable arrangement is obtained.

Figure 1:
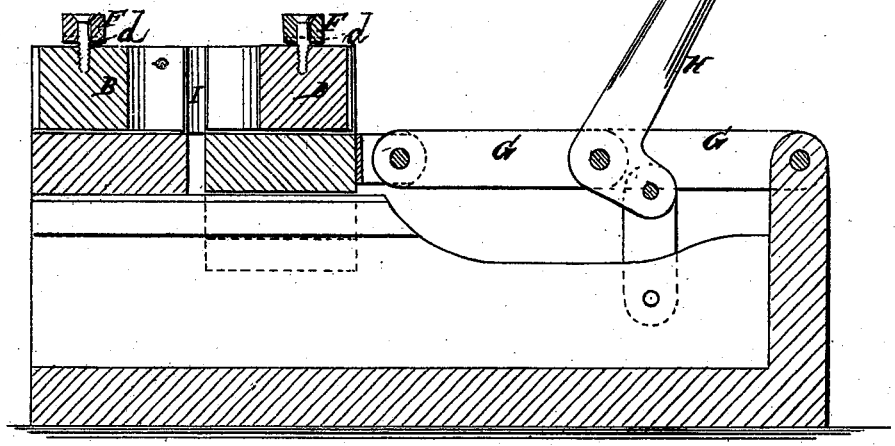
Figure 2:
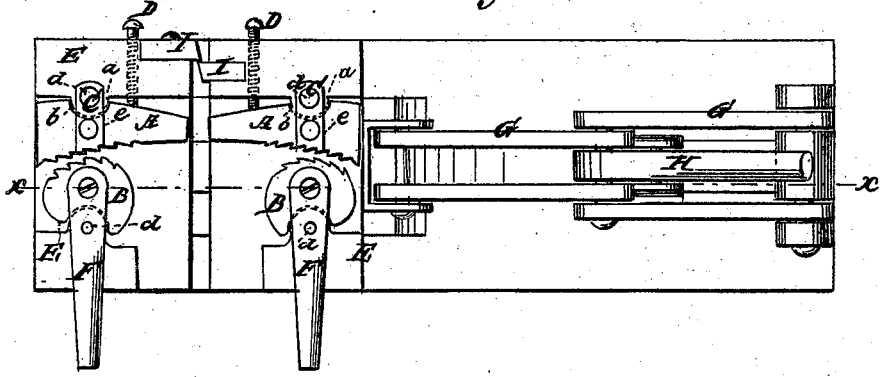

Figure 1 is a longitudinal sectional elevation of my improved tire-upsetter, taken on line $x$ $x$ of Fig. 2; and Fig. 2 is a plan view.

Similar letters of reference indicate corresponding parts.

A represents the jaws, against which the tire is griped by the pivoted jaws B, and which are commonly made stationary, but which are, according to my improvement, fixed on posts C, so that they can be readily shifted to suit tires of any curves; and they are provided with an adjusting-screw, D, by which to set them in any position desired after being shifted. Thus the jaws will work equally as well on tires of any size. These pivots, and also the pivots of the jaws B, I construct by making a half-round rib, $a$, on the face or wall of the supporting-block E, and a corresponding groove in the jaws to fit on, and turn about, the rib; and to keep the jaws in position, I connect them to the supporting-block by a small pin, $d$, and a link, $e$, or the handles F. One pair of the jaws is mounted on a stationary block, and the other pair on a movable one, as in other machines of this character, and the movable block is worked by the toggle-bars G and elbow-lever H. A pair of cutters, I, is attached to the blocks for utilizing the lever contrivance for a hand-power cutting-machine.

Having thus described my invention, I claim as new, and desire to secure by Letters Patent—

1. The jaws A, mounted on pivots C, having an adjusting-screw, D, substantially as specified.

2. The combination, in a tire-upsetter, of the supporting-blocks E, having a rib, $a$, and the jaws A B, provided with a groove, substantially as and for the purpose set forth.

CHARLES H. REYNOLDS.

Witnesses:
 T. B. MOSHER,
 ALEX. F. REYNOLDS.